(12) United States Patent
Mendenhall et al.

(10) Patent No.: US 7,221,436 B1
(45) Date of Patent: May 22, 2007

(54) SYSTEM AND METHOD FOR OPTIMIZATION-BASED SENSOR STEERING AND TRACKING

(75) Inventors: Scott Nelson Mendenhall, Fort Wayne, IN (US); Benjamin R. Neff, Fort Wayne, IN (US); Jeff D. Pruitt, Fort Wayne, IN (US)

(73) Assignee: ITT Manufacturing Enterprises Inc., Wilmington, DE (US)

( * ) Notice: Subject to any disclaimer, the term of this patent is extended or adjusted under 35 U.S.C. 154(b) by 408 days.

(21) Appl. No.: 10/913,038

(22) Filed: Aug. 5, 2004

(51) Int. Cl.
*G01C 3/08* (2006.01)

(52) U.S. Cl. .................. 356/4.01; 356/4.01; 356/5.07; 356/28; 356/139.03; 244/3.16; 250/203.2

(58) Field of Classification Search ................ 356/4.01
See application file for complete search history.

(56) References Cited

U.S. PATENT DOCUMENTS

| | | | |
|---|---|---|---|
| 5,780,839 A * | 7/1998 | Livingston | ............... 250/203.2 |
| 6,111,535 A | 8/2000 | Smith | |
| 6,563,451 B1 | 5/2003 | Krikorian et al. | |
| 2004/0057730 A1 * | 3/2004 | Littlejohn et al. | .......... 398/156 |

* cited by examiner

*Primary Examiner*—Thomas H. Tarcza
*Assistant Examiner*—Timothy Brainard
(74) *Attorney, Agent, or Firm*—RatnerPrestia

(57) ABSTRACT

A method of tracking a target includes: (a) receiving energy from the target at a plurality of spatial orientations; (b) processing the received energy; (c) evaluating a penalty function at each of the plurality of spatial orientations; (d) selecting a new spatial orientation based on the evaluation; and (e) orienting a receiver to receive energy from the target at the new spatial orientation.

20 Claims, 9 Drawing Sheets

SYSTEM AND METHOD FOR OPTIMIZATION-BASED SENSOR STEERING AND TRACKING

TECHNICAL FIELD

The present invention relates, in general, to a system and method for steering a sensor to track a target of interest. More specifically, the present invention provides sensor steering commands using parameter optimization that minimizes a penalty function.

BACKGROUND OF THE INVENTION

Tracking functions are conventionally implemented by using a servo system to position or spatially orient a sensor so that it may receive signals from a target of interest. An error signal is generated when there is a discrepancy between the measured and desired sensor orientations. The error signal is used to drive a controller, which in turn generates signals to move the servo system and sensor toward the desired spatial orientation. As the sensor is moved toward the desired orientation, the pointing error is reduced.

There are targets of interest that one would like to track where a direct measurement of target position or orientation is difficult or impossible. In these cases, a conventional tracking system that uses a direct measurement of position error to drive a servo system may be of little use. One such target of interest is a plume or puff of gas moving in turbulent wind conditions.

It is, however, often possible to measure some property of the target, or its surrounding environment, and use this information to track the target. When attempting to track a target, such as a plume or puff of gas in turbulent wind conditions, the method used by the present invention has significant advantages.

SUMMARY OF THE INVENTION

To meet this and other needs, and in view of its purposes, the present invention provides a method of tracking a target including the steps of: (a) receiving energy from the target at a plurality of spatial orientations; (b) processing the received energy; (c) forming a penalty function; (d) evaluating the penalty function at each of the plurality of spatial orientations; (e) selecting a further spatial orientation based on the evaluating of step (d); and (f) orienting a receiver to receive energy from the target at the further spatial orientation.

Another embodiment of the invention includes a method of orienting a receiver to track a target. The method includes the steps of: (a) choosing a first set of points corresponding to a plurality of spatial orientations; (b) separately orienting a receiver to receive energy from each of the first set of points; (c) evaluating a penalty function of received energy at each point of the first set of points; (d) choosing a second set of points based on the evaluation of step (c); (e) separately orienting a receiver to receive energy from at least one point of the second set of points; (f) evaluating the penalty function at the at least one point of the second set of points; (g) selecting a point of the second set of points resulting in a minimum value of the penalty function; (h) replacing a point of the first set of points with the point selected in step (g) to obtain a modified first set of points; and (i) orienting the receiver based on the modified first set of points.

Yet another embodiment of the invention includes a method of tracking a target having the steps of: (a) receiving energy from the target at a plurality of spatial orientations; (b) forming a penalty function based on the received energy; (c) evaluating the penalty function at the plurality of spatial orientations; (d) selecting a minimum value of the penalty function evaluated in step (c); and (e) orienting a receiver to track the target based on the selected minimum value in step (d). Step (d) includes measuring received energy at an on-line wavelength and an off-line wavelength, the on-line wavelength corresponding to an absorption resonance of a gas and the off-line wavelength corresponding to no-absorption of energy by the gas, and calculating the penalty function as a ratio of the received energy at the on-line wavelength and the received energy at the off-line wavelength.

Still another embodiment of the invention includes an optimization-based sensor steering and tracking system having a receiver/transmitter for receiving reflected energy from a target at a plurality of spatial orientations; a gimbaled platform for orienting the receiver/transmitter to receive the reflected energy from the plurality of spatial orientations, and a processor for evaluating a penalty function at each of the plurality of spatial orientations. The processor is coupled to the gimbaled platform for controlling an orientation of the receiver/transmitter, based on evaluation of the penalty function at each of the plurality of spatial orientations.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1:
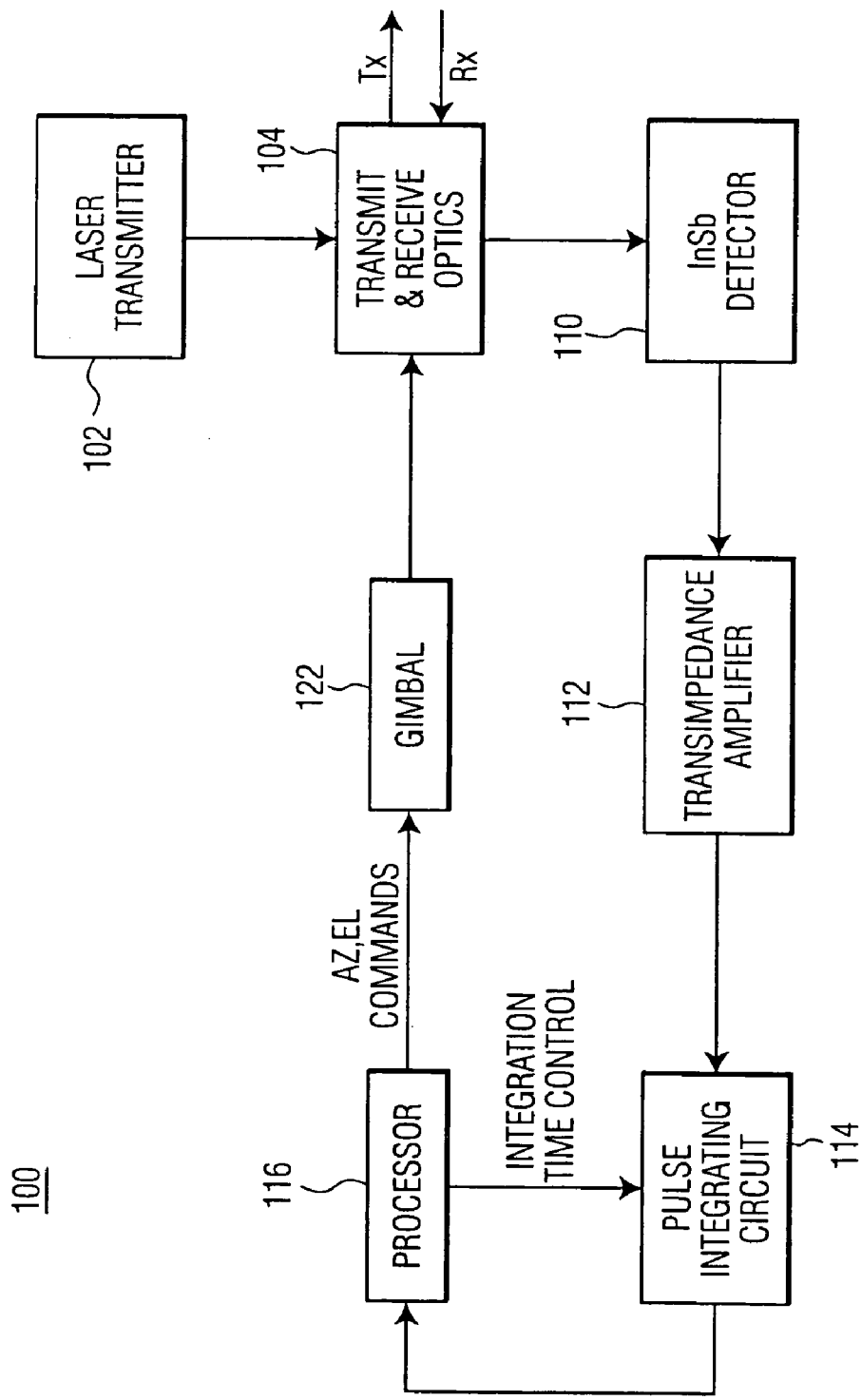
FIG. 1 is a system block diagram showing an optimization based sensor steering and tracking system, in accordance with an embodiment of the present invention.

As will be described, the present invention includes parameter optimization algorithms, which may be used to find a minimum value of a penalty function. The penalty function, which is constructed to satisfy an optimal solution to some problem, typically depends on a set of N parameters that an optimizer module may vary to find its minimum value. The set of N parameters (not necessarily unique) that corresponds to the minimum value represents the optimal solution to the problem.

An example of optimization-based tracking, implemented by the present invention, is a solution to the problem of active tracking of a target. An active tracking system broadcasts energy from a transmitter and receives reflected energy at a receiver. Measurements of the broadcast energy and the received energy are used by the present invention to evaluate a penalty function to track an object of interest. A signal that represents tracking accuracy (i.e., reflected electromagnetic power, etc.) may be maximized or minimized.

The present invention uses a parameter optimization algorithm to issue commands to a beam steering device to change the direction of the transmitted beam energy, so as to minimize a penalty function. The penalty function is constructed so that its minimum value corresponds to "best" tracking. For example, with a mechanically gimballed beam steering mechanism, the optimizer module may issue spatial orientation commands, such as azimuth and elevation commands, to steer the transmitter beam energy in a way that minimizes the tracking penalty function.

The present invention uses an update rate of beam steering commands that are sufficiently fast compared to the dynamics of the object being tracked. As a result, detailed knowledge of the target dynamics is not necessary for successful tracking.

An exemplary embodiment of an optimization-based tracking system includes a laser transmitter that transmits a pulsed MWIR laser beam or signal toward a cloud of gas at two different wavelengths. The first wavelength, known as the "online" wavelength, corresponds to an absorption resonance of the gas, and the second wavelength, known as the "offline" wavelength, is sufficiently far enough from the absorption resonance of the gas that it suffers effectively no absorption. The laser transmitter pulses each of the wavelength signals at a non-overlapping 50% duty cycle. Thus, when the transmitter is pulsing the laser beam at the online wavelength, it is not pulsing the laser beam at the offline wavelength, and when the transmitter is pulsing the laser beam at the offline wavelength, it is not pulsing the laser beam at the online wavelength. In one exemplary embodiment, the pulse repetition frequency (PRF) of the laser beam at the online wavelength is 750 hertz and the PRF of the laser beam at the offline wavelength is 750 hertz.

The transmitted laser beams are reflected back to the receiver. The power of the reflected beams are measured and analyzed to determine the concentration-length product of the gas. When the laser beam at the online wavelength passes through the gas, the received power of the reflected beam is smaller than when the same laser beam does not pass through the gas and is mostly reflected. The same is true for transmission and reflection of the laser beam at the offline wavelength.

The present invention utilizes a penalty function based upon a ratio of the received power of the laser beam at the online wavelength to the received power of the laser beam at the offline wavelength, namely, P(online)/P(offline). Minimization of the penalty function results in a spatial orientation corresponding to a minimum of this ratio. The minimum ratio represents a spatial point (azimuth, elevation) having a high absorption resonance characteristic due to the cloud of gas. Maintaining that minimum ratio implies that the transmitter/receiver is properly oriented and is optimally tracking the cloud of gas.

The optimization-based algorithm implemented by the present invention for plume tracking is based on a Nelder-Mead direct search simplex optimization algorithm known as AMOEBA. The present invention uses AMOEBA to issue azimuth and elevation commands to a beam steering gimbal, so as to minimize the penalty function that includes the online power/offline power ratio. Additional terms may also be included in the penalty function to prevent the gimbal from exceeding its azimuth and elevation limits. The beam steering mechanism orients the transmitter/receiver based on minimization of the penalty function.

It will be appreciated that the beam steering mechanism of the present invention advantageously relies only on minimizing the penalty function and does not require any closed loop control servo mechanisms to spatially steer the transmitter/receiver.

An advantage of the optimization-based tracking system is the ability to configure the penalty function to achieve desired system tracking properties. In one exemplary embodiment, the penalty function may be configured to have a minimum value corresponding to a predetermined value of the concentration-length product. Thus, the tracking system may track a region of the gas cloud for which the concentration-length product is closest to the predetermined value. In another exemplary embodiment, the tracking system may optimize multiple vector penalty functions, which allow for tracking of the target by simultaneous optimization of multiple objective functions.

Referring now to FIG. 1, there is shown an optimization-based tracking system, in accordance with an embodiment of the invention, generally designated as 100. As shown, system 100 includes laser transmitter 102, transmit/receive optics 104, detector 110, amplifier 112, pulse integrating circuit 114, processor 116 and gimbal 122. Laser transmitter 102 generates the online and offline laser beams, each pulsed at a PRF of 750 Hz. Both beams may be alternately transmitted toward a target of interest (not shown) by way of optics 104. The transmitted beams may then be reflected back from the target and received by optics 104.

Optics 104 receives the reflected beams and directs them to detector 110. Detector 110 may be, for example, an InSb detector that outputs a current signal proportional to the received power of each of the reflected beams. Amplifier 112 may be, for example, a transimpedance amplifier that amplifies the current signal from detector 110 and outputs a voltage signal proportional to the input current. Pulse integrating circuit 114, controlled by an integration time control signal from processor 116, integrates the voltage pulses corresponding to the online wavelength and the voltage pulses corresponding to the offline wavelength, as they are outputted from amplifier 112.

Processor 116 receives an integrated pulse amplitude level corresponding to the received power level of the online wavelength signal and the received power level of the offline wavelength signal. The processor then calculates the online/offline power ratio of the penalty function associated with the spatial point from which the beams have been reflected. Based on the calculated power ratios of multiple spatial points, the processor outputs azimuth and elevation command signals to gimbal 122 for reorienting the transmit/receive optics to a new or different spatial point.

As an example, the integration period of the pulse integrating circuit may be set to a tenth of a second. In the example of the online signal having a PRF of 750 Hz and the offline signal having a PRF of 750 Hz, the pulse integrating circuit integrates ten pulses. The processor may also execute the optimization based tracking control at a tenth of second period. Of course, different PRFs, integration periods and optimization based tracking periods may be selected depending on the characteristics of the target being tracked.

By way of further examples, the laser used in transmitter 102 may have an output power of 200–225 mW at 3.3 microns, a PRF of 1500 Hz and a pulse width of 4.7 nsec. The laser may have a line width less than 0.05 nm and a divergence of 4 mradians.

A 1064 nm pulsed laser may be used as a pump with a periodically poled lithium niobate (PPLN) crystal as the non-linear medium. The seeding to the optical parametric generation (OPG) may be done by a 5 watt C-band (1533–1565 nm) EDFA, which in turn, may be seeded by one of two DFBs. Each DFB may be tuned to a specific wavelength. After the non-linear conversion, one DFB may produce a pulse at the online wavelength and the other DFB may produce a pulse at the offline wavelength.

The optimization algorithm executed by processor 116 tracks gradients in a sequence of thermal images of the target. An initial simplex, or a spatial configuration having n dimensions that are determined by n+1 points, is defined by the optimization algorithm. For example, a triangle formed by its three vertices, or points, has two dimensions defined by a plane.

The optimization algorithm, when using a spatial configuration having two dimensions, defines the initial simplex as a triangle with three spatial points. Each point of the triangle is further defined by a pair of azimuth and elevation (az, el) coordinates. After defining the triangle, the penalty function is calculated for each of the points on the simplex. The penalty function is dependent on the value of the pixel being investigated or the point being investigated. Each time a new pixel is queried, a new frame may be used to retrieve the value of the penalty function at that (az, el) coordinate.

Once the penalty function has been calculated for each point on the initial simplex, a new simplex is identified by the algorithm. The algorithm then calculates the penalty function for each newly identified point in the new simplex. This algorithm may be executed repeatedly by the processor as it attempts to find the smallest penalty function of a point in a newly identified simplex.

The manner in which the optimization based tracking system identifies a new simplex will now be described by referring to FIGS. 2A–2E. The new simplex is identified by different processes. These processes are referred to herein as a reflection, an expansion, an outside contraction, an inside contraction, or a shrink.

Figure 2A:
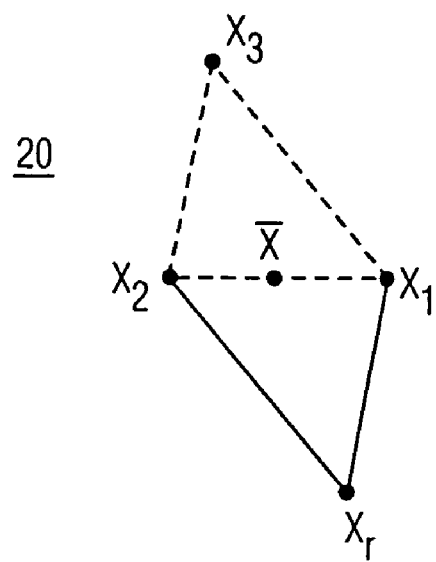
FIGS. 2A–2E are each illustrations of a new simplex formed from an initial simplex, as calculated by an optimization based method of the present invention.

Referring first to FIG. 2A, there is shown a diagram of a reflection, generally designated as 20. The initial simplex includes a triangle formed by points or vertices $X_1$, $X_2$ and $X_3$. After reflection, a new simplex is formed defined by points $X_1$, $X_2$ and $X_r$. As shown, $X_r$ is defined by the following equations:

$$X_r = \overline{X} + (\overline{X} - X_3) \tag{1a}$$

$$\overline{X} = \frac{\sum_{i=1}^{2} X_i}{2} \tag{1b}$$

where $\overline{X}$ is the mathematical mean of $X_1$ and $X_2$ and lies at the midpoint of $X_1X_2$. $\overline{X}$ also lies at the intersection of lines $X_3X_r$ and $X_2X_1$.

Figure 2B:
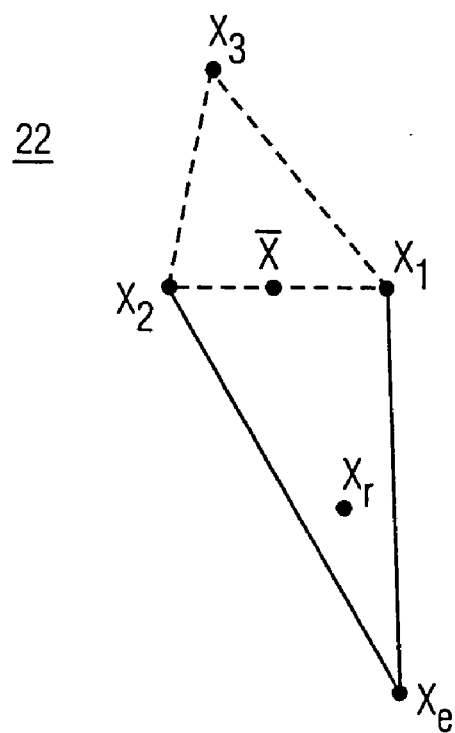

FIG. 2B depicts an expansion, generally designated as 22. The initial simplex includes a triangle formed by points or vertices $X_1$, $X_2$ and $X_3$. After expansion, a new simplex is formed by points $X_1$, $X_2$ and $X_e$. As shown, $X_e$ is defined by the following equations:

$$X_e = \overline{X} + 2(X_r - X) \tag{2a}$$

$$\overline{X} = \frac{\sum_{i=1}^{2} X_i}{2} \tag{2b}$$

where $\overline{X}$ is the mathematical mean $X_1$ and $X_2$ and lies at the midpoint of $X_1X_2$. $\overline{X}$ also lies at the intersection of lines $X_3X_e$ and $X_2X_1$. Reflection point $X_r$ (as defined by FIG. 2A) is at a point that is closer to $\overline{X}$ than expansion point $X_e$ (segment $X_e\overline{X}$ is longer than segment $X_r\overline{X}$).

Figure 2C:
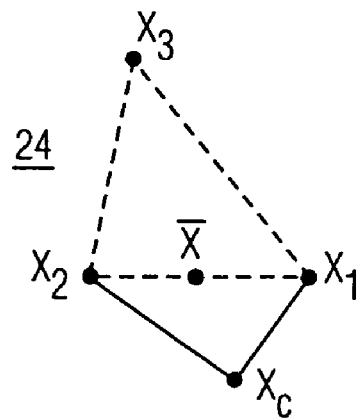

FIG. 2C depicts an outside contraction, generally designated as 24. The initial simplex includes a triangle formed by points $X_1$, $X_2$ and $X_3$. After outside contraction, a new simplex is formed defined by points $X_1$, $X_2$ and $X_c$. As shown, $X_c$ is determined by the following equations:

$$X_c = \overline{X} + \tfrac{1}{2}(X_r - X) \tag{3a}$$

$$\overline{X} = \frac{\sum_{i=1}^{2} X_i}{2} \tag{3b}$$

where $\overline{X}$ is the mathematical mean of $X_1$ and $X_2$ and lies at the midpoint of $X_1X_2$. $\overline{X}$ also lies at the intersection of lines $X_3X_c$ and $X_2X_1$. Reflection point $X_r$ is further away from $\overline{X}$ than the outside contraction point $X_c$ (segment $X_c\overline{X}$ is shorter than segment $X_r\overline{X}$).

Figure 2D:
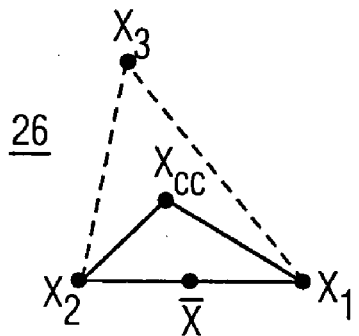

FIG. 2D depicts an inside contraction, generally designated as 26. The initial simplex includes a triangle formed by points $X_1$, $X_2$ and $X_3$. After inside contraction, a new simplex is formed defined by points $X_1$, $X_2$ and $X_{cc}$. As shown, $X_{cc}$ is defined by the following equations:

$$X_{cc} = \overline{X} - \tfrac{1}{2}(\overline{X} - X_3) \tag{4a}$$

$$\overline{X} = \frac{\sum_{i=1}^{2} X_i}{2} \tag{4b}$$

where $\overline{X}$ is the mathematical mean of $X_1$ and $X_2$ and lies at the midpoint of $X_1X_2$. $\overline{X}$ also lies at the intersection of lines $X_3X_{cc}$ and $X_2X_1$.

Figure 2E:
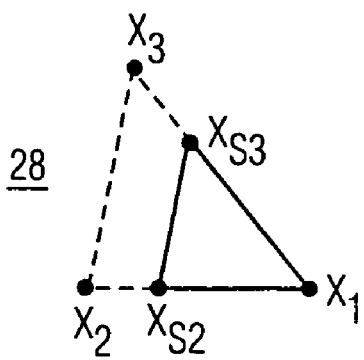

Finally, FIG. 2E depicts a shrink, generally designated as 28. The initial simplex includes a triangle formed by points $X_1$, $X_2$ and $X_3$. After a shrink, a new simplex is formed defined by points $X_1$, $X_{s2}$ and $X_{s3}$. As shown, $X_{s2}$ and $X_{s3}$ are defined by the following equations:

$$X_{s2} = X_1 + \tfrac{1}{2}(X_2 - X_1) \tag{5a}$$

$$X_{s3} = X_1 + \tfrac{1}{2}(X_3 - X_1) \tag{5b}$$

Of all the processes, a shrink is the only process that is defined by moving two points. Line $X_1X_{s2}$ intersects $X_2$, and its segment is shorter than segment $X_1X_2$. Line $X_1X_{s3}$ intersects $X_3$, and its segment is shorter than segment $X_1X_3$.

Figure 3:
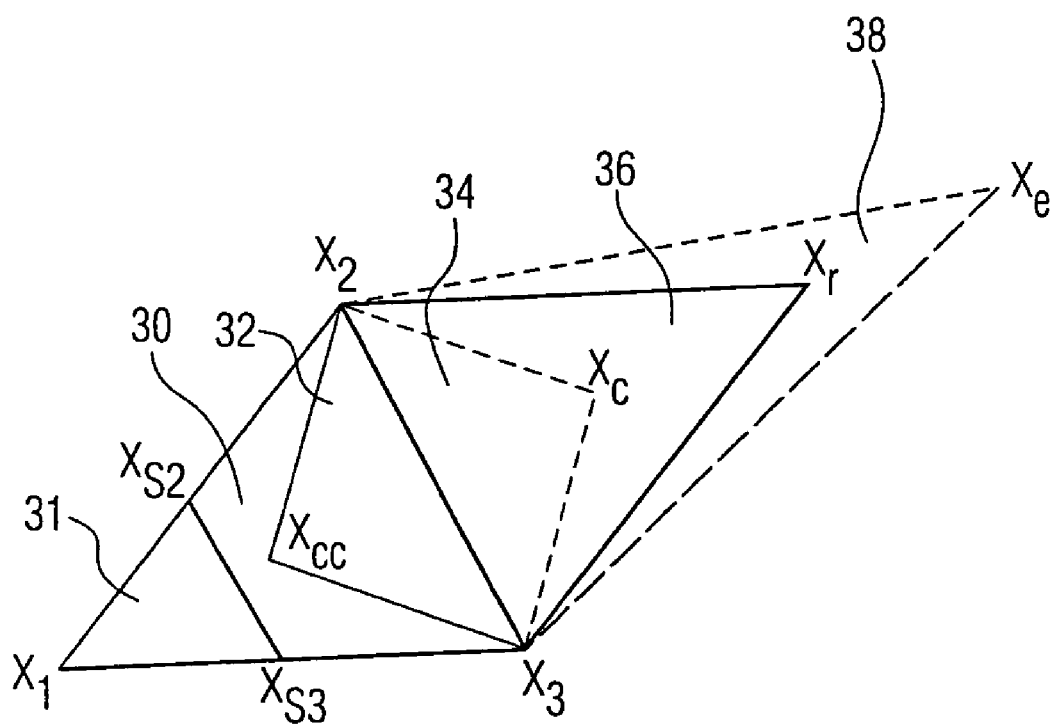
FIG. 3 is an illustration of the various simplexes in relation to one another, as calculated by the optimization based method of the present invention.

Referring next to FIG. 3, the simplexes, defined in FIGS. 2A–2E, are shown sized in relationship to one another. Simplex 30 is the initial simplex defined by points $X_1$, $X_2$, and $X_3$. Simplex 31 is the new simplex formed by a shrink defined by points $X_1$, $X_{s2}$, and $X_{s3}$. Simplex 32 is the new simplex resulting from an inside contraction defined by points $X_2$, $X_3$, and $X_{cc}$. New simplex 34, the result of an outside contraction, is defined by points $X_2$, $X_3$, and $X_c$. New simplex 36 is the simplex resulting from a reflection and is described by points $X_2$, $X_3$, and $X_r$. New simplex 38, the result of an expansion, is formed by points $X_2$, $X_3$, and $X_e$.

Figure 4:
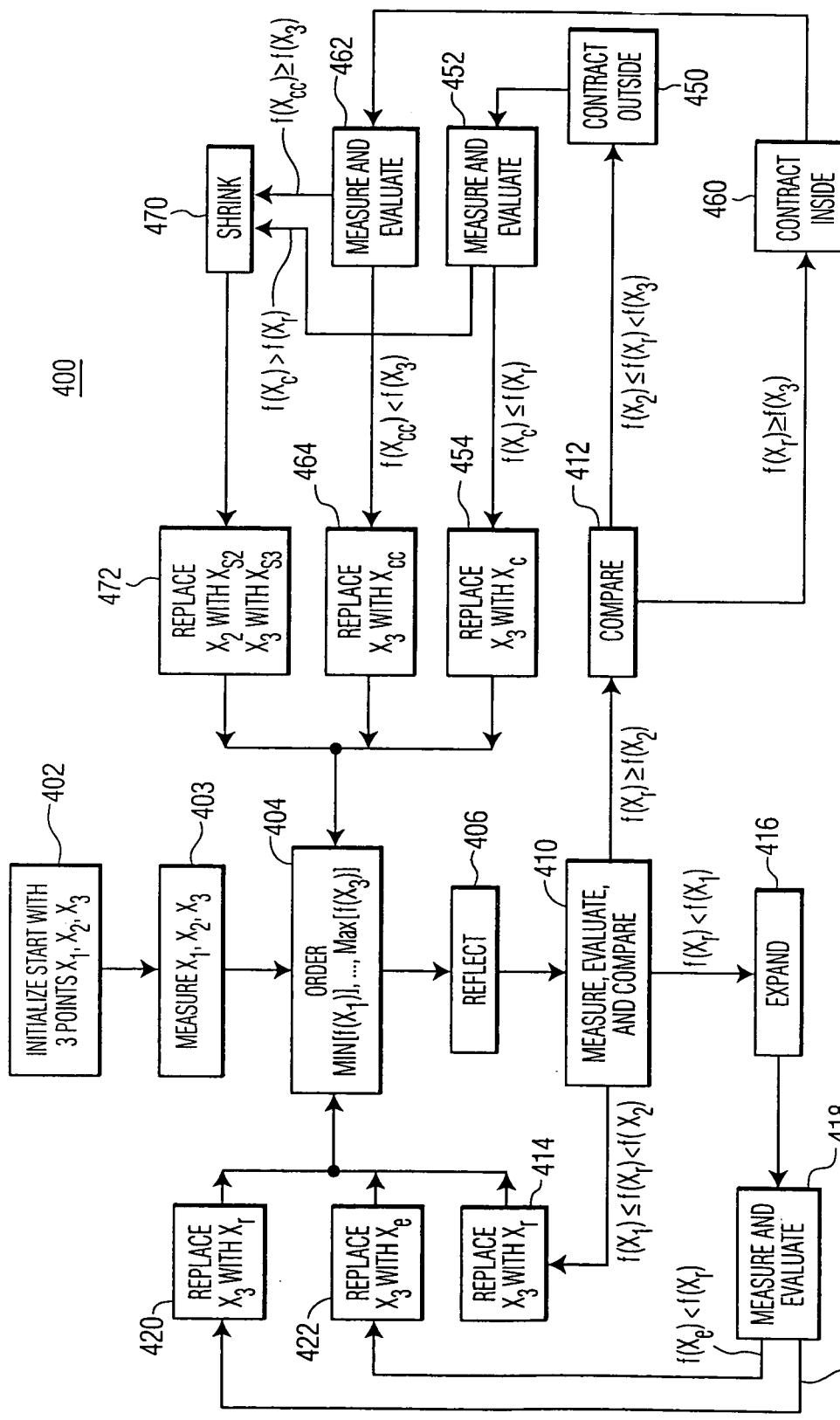
FIG. 4 is a flow diagram of an optimization based method for locating a minimum value of a penalty function having two-dimensions, in accordance with an embodiment of the present invention.

Referring now to FIG. 4, there is shown a flow diagram of an exemplary method of the present invention, illustrating an optimization method for locating a minimum value of a penalty function in two dimensions. The minimization method, generally designated as 400, begins at step 402 with initialization. Initialization establishes an initial (or current) simplex having vertices $X_1$, $X_2$ and $X_3$.

It will be appreciated that in one exemplary embodiment, points $X_1$, $X_2$ and $X_3$ of the initial simplex may be chosen at random. In another exemplary embodiment, the initial simplex may be chosen by scanning a spatial plane, sampling evaluating points in that spatial plane, and then selecting three points to form the initial simplex.

Step 403 of method 400 measures the value of the penalty function f(X) at each of the points $X_1$, $X_2$ and $X_3$ of the initial (or current) simplex to yield $f(X_1)$, $f(X_2)$ and $f(X_3)$. Step 404 then orders the points of the initial simplex as $f(X_1)$, $f(X_2)$ and $f(X_3)$, so that the values of f(X) are ordered from minimum to maximum. As shown in FIG. 4, by way of example, the point yielding the greatest value of the penalty function f(X) is $X_3$, the point yielding a lower value for the penalty function is $X_2$, and the point providing the lowest value for the penalty function is $X_1$.

Step 406 performs a reflection by using $X_3$ to determine $X_r$. The $X_r$ is determined by equations (1a) and (1b). The optimization method continues to step 410 and takes a power measurement at $X_r$ (online power and offline power measurements), evaluates the penalty function at $X_r$ to yield $f(X_r)$, and compares $f(X_r)$ to $f(X_1)$ and $f(X_2)$. If $f(X_r)$ is greater than or equal to $f(X_2)$, step 410 branches to comparison step 412. Alternatively, if $f(X_r)$ is greater than or equal to $f(X_1)$ and less than $f(X_2)$, step 410 branches to replacement step 414. However, if $f(X_r)$ is less than $f(X_1)$, then step 410 branches to expansion step 416. Thus, step 410 evaluates all possible relationships among $X_r$, $X_1$, and $X_2$.

Assuming that the method branches to comparison step 412, a comparison is made among $f(X_r)$, $f(X_2)$ and $f(X_3)$. If $f(X_r)$ is greater than or equal to $f(X_2)$ and less than $f(X_3)$, step 412 branches to outside contraction step 450. However, if $f(X_r)$ is greater than or equal to $f(X_3)$, step 412 branches to inside contraction step 460.

Outside contraction step 450 computes $X_c$ as a candidate for inclusion in a new simplex. The $X_c$ is determined by equations (3a) and (3b). Step 450 then proceeds to measurement and evaluation step 452, which computes a value of the penalty function at $X_c$ to yield $f(X_c)$. If the value of the penalty function at $X_c$ is less than or equal to the value of the penalty function at $X_r$, then step 452 branches to replacement step 454 which replaces $X_3$ in the current simplex with $X_c$, and the method returns to ordering step 404. On the other hand, if the value of the penalty function at $X_c$ is greater than the value of the penalty function at $X_r$, then step 452 branches to shrink step 470.

Shrink step 470 computes two new vertices $X_{s2}$ and $X_{s3}$ of the current simplex using equations (5a) and (5b). Step 470 then passes to replacement step 472, which replaces $X_2$ and $X_3$ in the current simplex with $X_{s2}$ and $X_{s3}$, respectively. The method returns to ordering step 404.

Returning to inside contraction step 460, $X_{cc}$ is computed as a is candidate for inclusion in a new simplex. $X_{cc}$ is determined using equations (4a) and (4b). Step 460 then proceeds to measurement and evaluation step 462, which computes a value of the penalty function at $X_{cc}$ to yield $f(X_{cc})$. If the value of the penalty function at $X_{cc}$ is less than the value of the penalty function at $X_3$, then step 462 branches to replacement step 464, which replaces $X_3$ in the current simplex with $X_{cc}$, and the method returns to ordering step 404. In step 462, however, if the value of the penalty function at $X_{cc}$ is greater than or equal to the value of the penalty function at $X_3$, step 462 branches to shrink step 470. As previously described, step 470 computes two new vertices and then returns to ordering step 404.

Returning now to step 410, branching to step 414 and step 416 will now be described. Replacement step 414 replaces point $X_3$ in the current simplex with point $X_r$, and the method returns to ordering step 404. Expansion step 416 computes $X_e$ as a candidate for inclusion in the new simplex. The $X_e$ is computed using equations (2a) and (2b). Step 416 then passes to measurement and evaluation step 418.

Measurement and evaluation step 418 determines the value of the penalty function at point $X_e$ to yield $f(X_e)$. If $f(X_e)$ is greater than or equal to $f(X_r)$, step 418 branches to replacement step 420 which replaces point $X_3$ in the current simplex with point $X_r$ and the method returns to ordering step 404. Returning to step 418, if $f(X_e)$ is less than $f(X_r)$, however, step 418 branches to replacement step 422 which replaces point $X_3$ in the current simplex with point $X_e$, and the method returns to ordering step 404.

Figure 5:
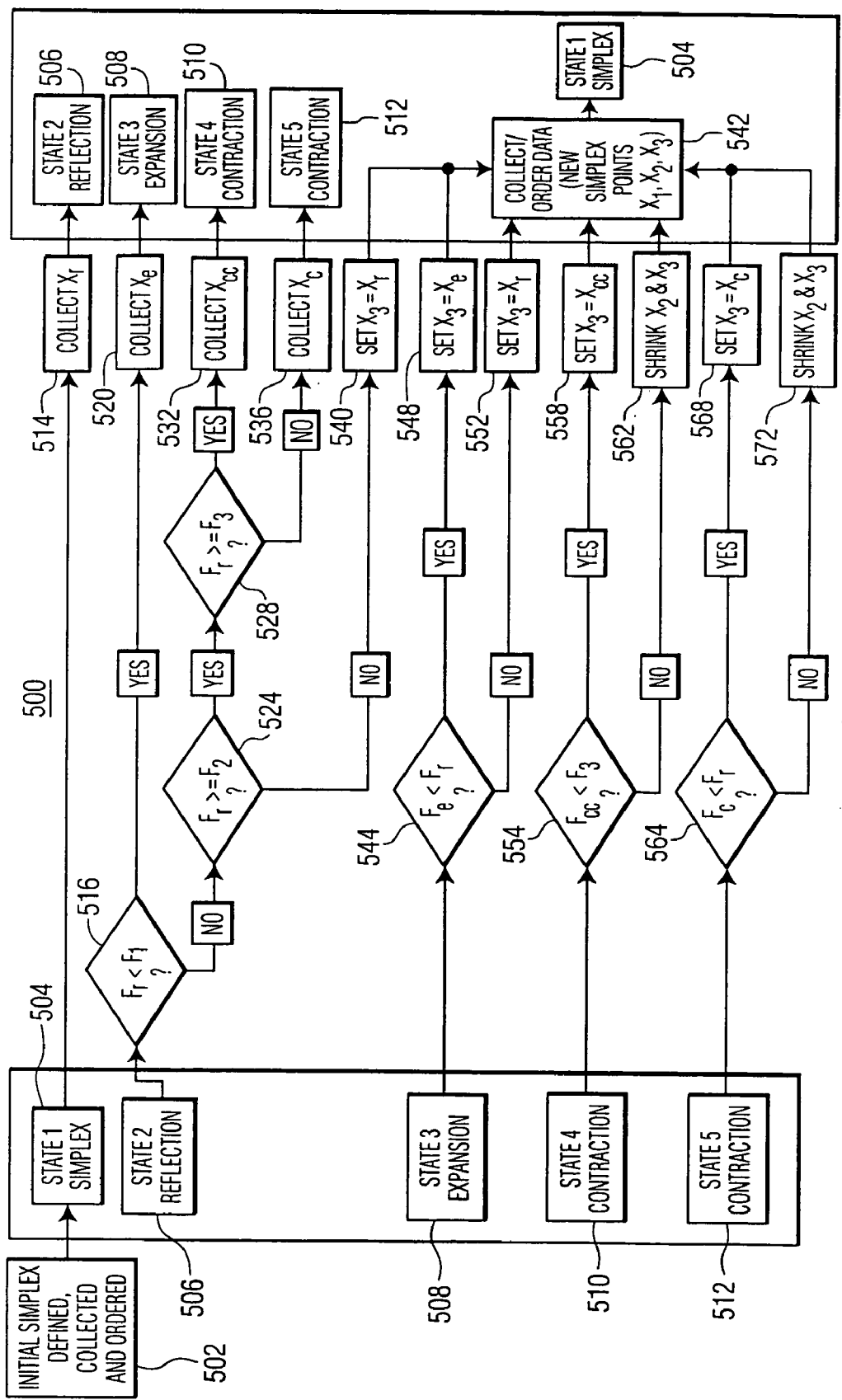
FIG. 5 is a state diagram of the optimization based method of FIG. 4, in accordance with an embodiment of the present invention.

Having described optimization method 400 by way of a flow diagram, a similar optimization method will now be described by way of a state machine shown in FIG. 5. The state machine, designated generally as 500, begins at initialization step 502 which initializes an initial or current simplex by selecting points or vertices $X_1$, $X_2$ and $X_3$ of a triangle. Step 502 evaluates the penalty function F at each of the selected points to yield $F_1$, $F_2$ and $F_3$ corresponding to $X_1$, $X_2$, and $X_3$, respectively. The points are then ordered according to $F_1$, $F_2$ and $F_3$ from lowest value of F to highest value of F. By way of example, the point with the greatest value of F is $X_3$, the point with the next greatest value of F is $X_2$, and the point with the lowest value of F is $X_1$. Execution passes to state 1 simplex (step 504), then to collection step 514 which calculates $X_r$ and Fr, the value of F at $X_r$ and then continues to state 2 reflection (step 506).

Execution passes from state 2 reflection (step 506) to comparison step 516, which considers the relationship $F_r<F_1$. If the relationship holds, execution branches to collection step 520 which calculates $X_e$ and $F_e$, the value of F at $X_e$. State 3 expansion (step 508) is entered next. If the relationship does not hold, however, execution branches to comparison step 524, which considers the relationship $F_r \geq F_2$.

If the relationship in comparison step 524 holds, execution branches to comparison step 528 which considers the relationship $F_r \geq F_3$. If the relationship holds, execution branches to collection step 532, which calculates $X_{cc}$ and $F_{cc}$, the value of F at $X_{cc}$. State 4 contraction (step 510) is then entered. If the relationship does not hold, however, execution branches to collection step 536, which calculates $X_c$ and $F_c$, the value of F at $X_c$. State 5 contraction (step 512) is then entered.

Returning to comparison step 524, if the relationship $F_r \geq F_2$ does not hold, execution branches to replacement step 540, which replaces $X_3$ of the current simplex with $X_r$, and then proceeds to order data step 542. Order data step 542 orders the points of the current simplex according to their values of F. Execution then returns to state 1 simplex (step 504).

Turning next to state 3 expansion (step 508), execution passes to comparison step 544, which considers the relationship $F_e < F_r$. If the relationship holds, execution branches to replacement step 548, which replaces $X_3$ in the current simplex with $X_e$, and then proceeds to order data step 542. If the relationship does not hold, however, execution branches to replacement step 552, which replaces $X_3$ in the current simplex with $X_r$, and then proceeds to order data step 542. As previously described, order data state 542 orders the points of the current simplex, and returns execution to state 1 simplex (step 504).

Returning to state 4 contraction (step 510), execution proceeds to comparison step 554, which considers the relationship $F_{cc} < F_3$. If the relationship holds, execution branches to replacement step 558, which replaces $X_3$ in the current simplex with $X_{cc}$, and then proceeds to order data step 542, which, as previously described, orders the points of the current simplex. Execution continues from order data step 542 to state 1 simplex (step 504). If the relationship does not hold, however, execution branches to shrink step 562. Shrink step 562 calculates $X_{s2}$ and $X_{s3}$ and then replaces $X_2$ and $X_3$ of the current simplex with $X_{s2}$ and $X_{s3}$, respectively. Execution moves to order data step 542, which orders the points of the current simplex and returns to state 1 simplex (step 504).

Turning next to state 5 contraction (step 512), execution proceeds to comparison step 564, which considers the relationship $F_c < F_r$. If the relationship holds, execution branches to replacement step 568, which replaces $X_3$ of the current simplex with $X_c$. The method then branches to order data step 542. If the relationship does not hold, however, execution passes to shrink step 572, which calculates $X_{s2}$ and $X_{s3}$ and replaces $X_2$ and $X_3$ of the current simplex with $X_{s2}$ and $X_{s3}$, respectively. Execution passes to order data step 542 and then returns to state 1 simplex (step 504).

Figure 6:
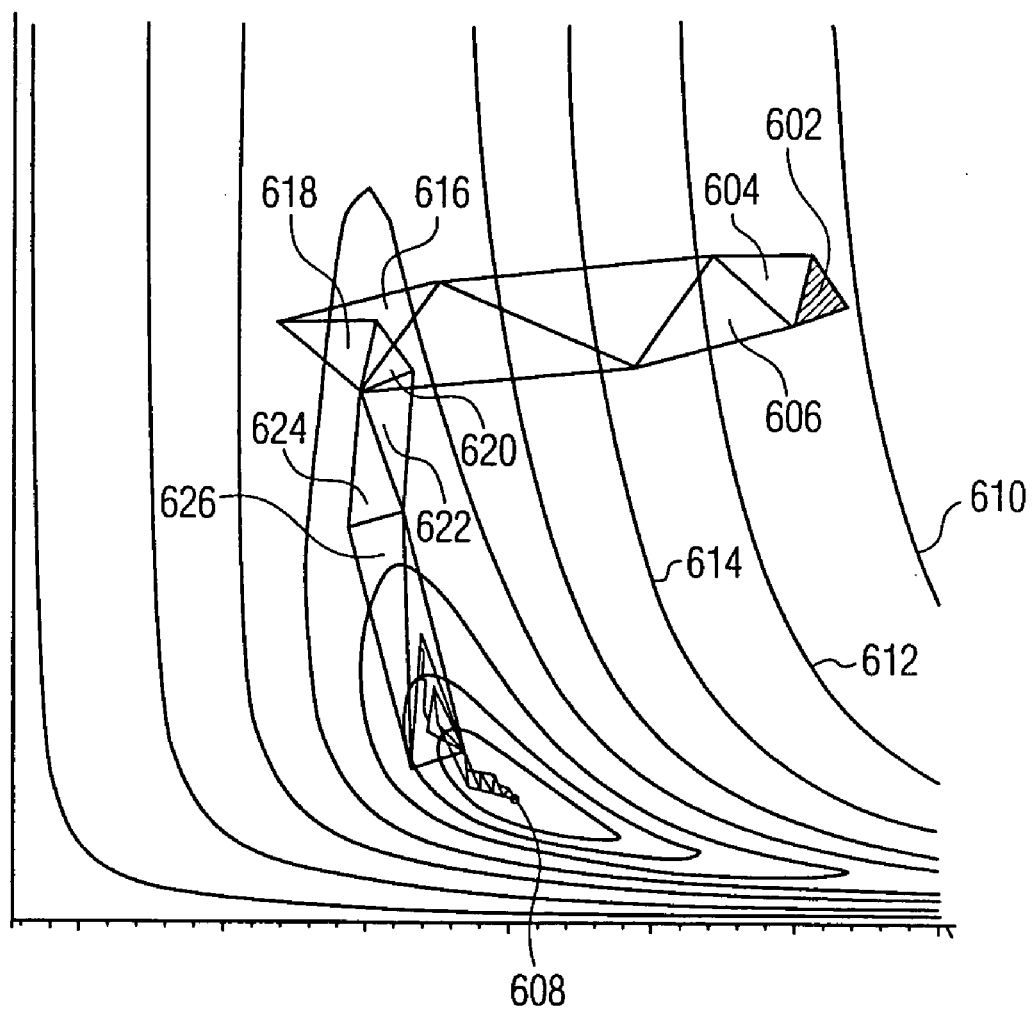
FIG. 6 is a plot of a simplex tracking sequence using an optimization based method of the present invention, as the simplex tracking sequence moves on a plane in two-dimensional space.

Referring next to FIG. 6, there is shown a simplex tracking sequence using the optimization method of the present invention. As shown, graph 600 has two axes representing a spatial plane. Several contour lines each corresponding to a constant value of a penalty function are also plotted, such as, contour line 610 contour line 612 and contour line 614.

Simplex 602 is the initial simplex. Simplex 604 is the next simplex resulting from an iteration of the optimization method formed by an expansion. As shown, simplex 602 and simplex 604 share two vertices. Simplex 606 is another simplex resulting from a further iteration of the optimization method formed by another expansion. As may be observed, new simplexes are formed by expansion, until simplex 616 is formed. At this stage, the optimization method realizes that it needs to change direction in its receiver/transmitter orientation. As a result, simplex 618 is formed by an inside contraction. Another simplex 620 is next formed by an outside contraction. Thereafter, the optimization method forms a sequence of expansion simplexes, such as 622, 624 and 626. Subsequently, the method forms a sequence of contraction simplexes until a final minimum sized simplex, designated 608, is formed. In this manner, the optimization method of the present invention quickly and effectively orients the gimbal (FIG. 1) to achieve a minimum sized simplex.

Referring next to FIG. 7, there is shown a flow diagram of a generalized optimization method for locating a minimum value of a penalty function in N dimensions. The minimization method, generally designated as 700, begins at step 702 with initialization. Initialization establishes an initial simplex having N+1 points or vertices. It will be appreciated that in one exemplary embodiment, the N+1 points may be chosen at random. In another exemplary embodiment, the simplex may be chosen after scanning a spatial area, sampling and evaluating the penalty function at N+1 points.

Ordering step 704 determines the value of the penalty function f at each of the N+1 points to establish N+1 values of f. The method orders these points so that the lowest value of f includes $X_1$, and the value of the penalty function at $X_1$ is designated $f(x_1)$. The point providing the greatest value of f is designated $X_{N+1}$, and the value of the penalty function at $X_{N+1}$ is designated $f(X_{N+1})$. The result of the ordering provides points $X_1, X_2, \ldots, X_{N+1}$, ordered according to the following relationship:

$$f(X_1) \leq f(X_2) \leq \ldots \leq f(X_{N+1}) \tag{6}$$

Step 706 performs a reflection using $X_{N+1}$ to determine $X_r$. The $X_r$ is calculated by the following equations:

$$X_r = \overline{X} + \rho(\overline{X} - X_{N+1}) \tag{7a}$$

$$\overline{X} = \frac{\sum_{i=1}^{N} X_i}{N} \tag{7b}$$

where $\rho$ is a constant and N is the number of dimensions. In an exemplary embodiment, $\rho = 1$.

Evaluation step 708 evaluates the penalty function at $X_r$ to yield $f_r$ and then compares $f_r$ to $f_1$ and fn. If the relationship $f_1 \leq f_r < f_n$ holds, evaluation step 708 branches to replacement step 710, which replaces point $X_{N+1}$ in the current simplex with point $X_r$. The method returns execution to ordering step 704.

Alternatively, if the relationship $f_r < f_1$ holds, evaluation step 708 branches to expansion step 712. Expansion step 712 performs an expansion on $X_r$ according to the following equations:

$$X_e = \overline{X} + \chi(X_r - \overline{X}) \tag{8a}$$

$$\overline{X} = \frac{\sum_{i=1}^{N} X_i}{N} \tag{8b}$$

where $\chi$ is a constant and N is the number of dimensions. In an exemplary embodiment, $\chi = 2$.

Evaluation step 714 then evaluates the penalty function at the point $X_e$ to yield $f_e$ and compare $f_r$ to $f_e$. If the relationship $f_e < f_r$ holds, evaluation step 714 branches to replacement step 716, which replaces $X_{N+1}$ of the current simplex with $X_e$ and returns execution to ordering step 704. If the relationship $f_e \geq f_r$ holds, however, execution branches to replacement step 718, which replaces $X_{N+1}$ of the current simplex with $X_r$. The method next returns to ordering step 704.

Figure 7A:
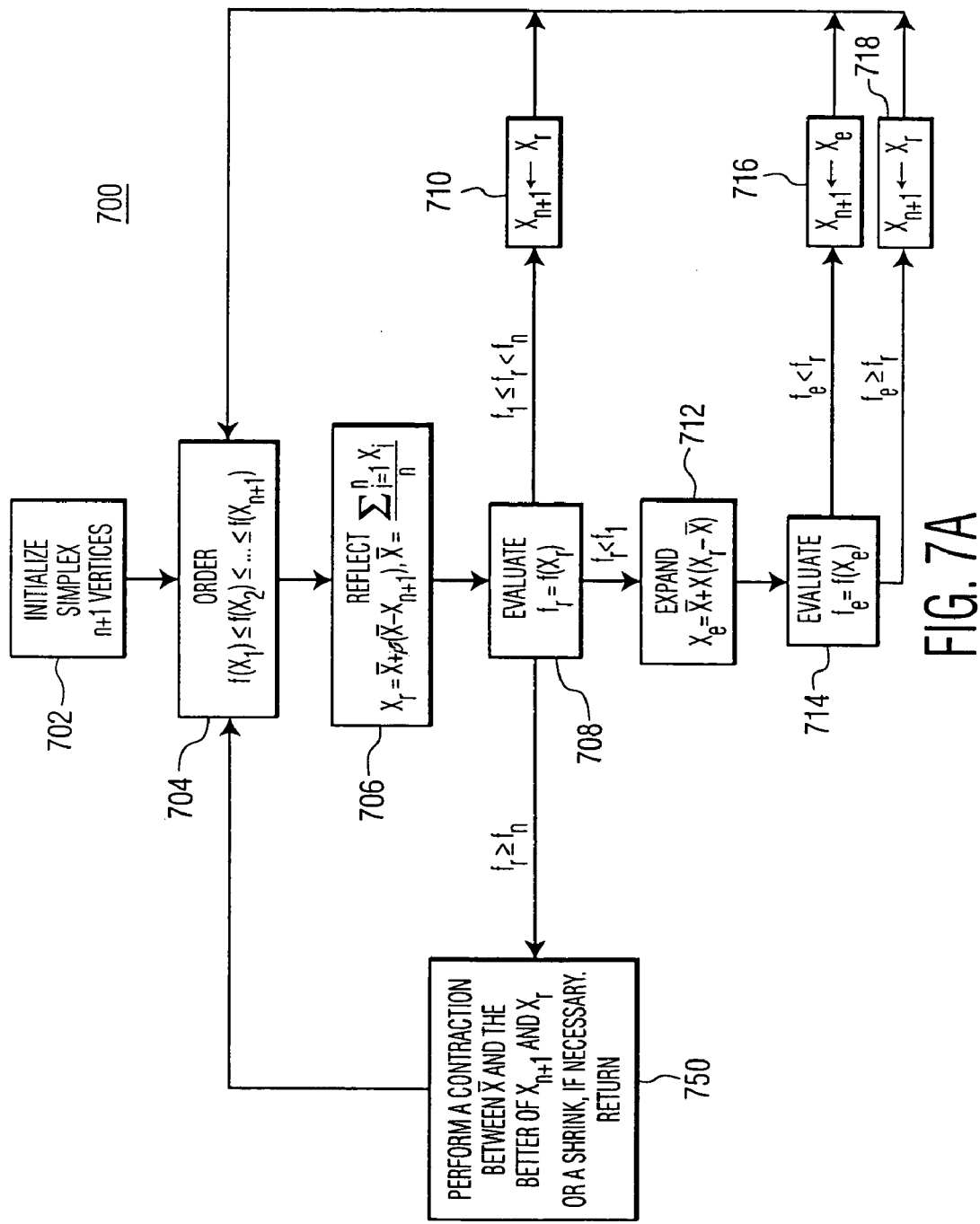
FIGS. 7A–7B are flow diagrams of a generalized optimization based method for locating a minimum value of a penalty function having N-dimensions, in accordance with an embodiment of the present invention.
Figure 7B:
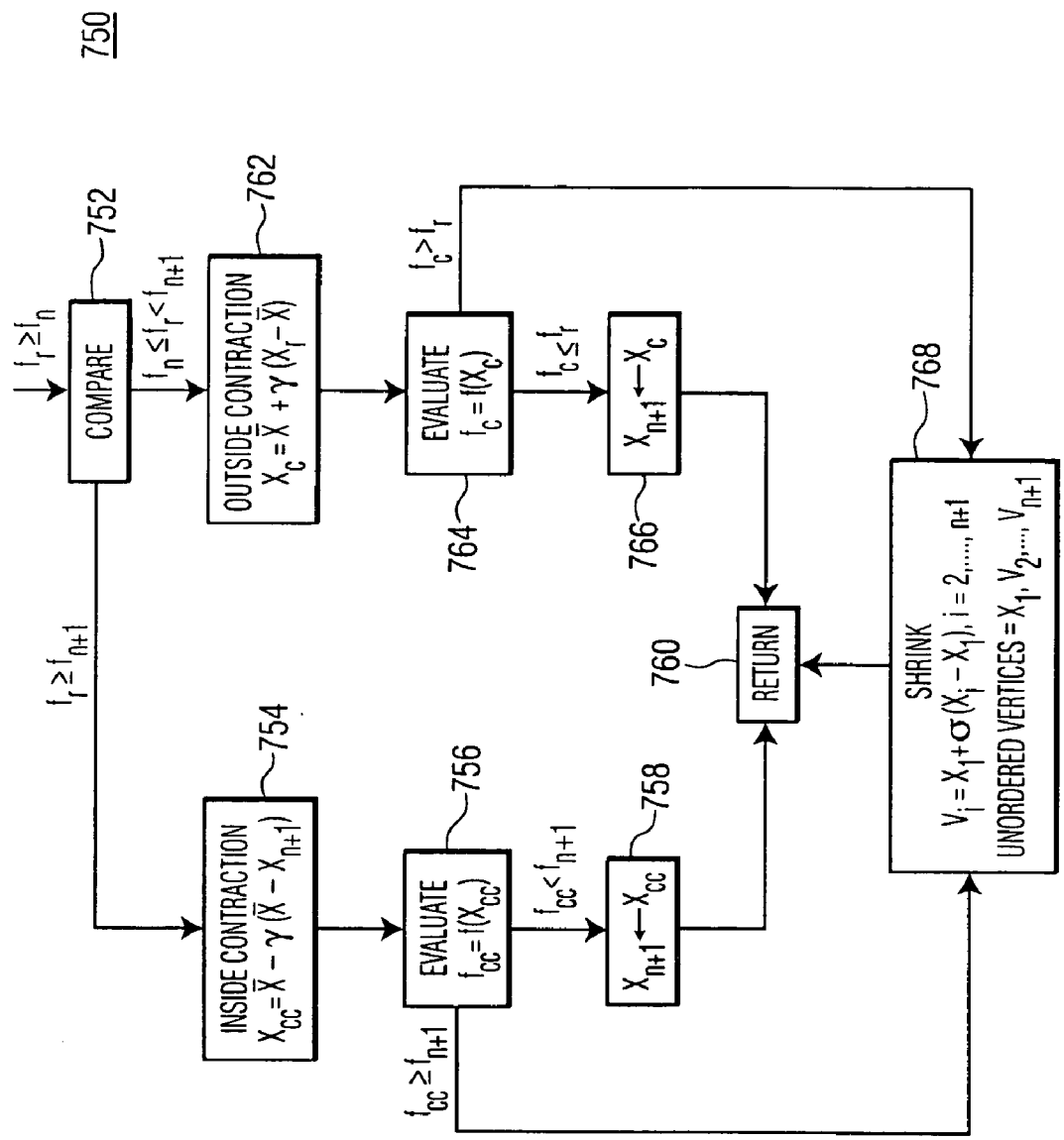

Referring back to evaluation step 708, if the relationship $f_r \geq f_n$ holds, execution branches to contraction or shrink step 750, which is shown in detail in FIG. 7B. Referring to FIG. 7B, execution begins at comparison step 752, which compares $f_n$, $f_r$, and $f_{N+1}$. If the relationship $f_n \leq f_r < f_{N+1}$ holds, step 752 branches to outside contraction step 762, which computes $X_c$ as a candidate for inclusion in a new simplex. $X_c$ is determined by the following equations:

$$X_c = \overline{X} + \gamma(X_r - \overline{X}) \tag{9a}$$

$$\overline{X} = \frac{\sum_{i=1}^{N} X_i}{N} \tag{9b}$$

where $\gamma$ is a constant and N is the number of dimensions. In an exemplary embodiment, $\gamma = \frac{1}{2}$.

Step 764 evaluates the penalty function at the point $X_c$ to yield $f_c$. If the relationship $f_c \leq f_r$, step 764 branches to replacement step 766, which replaces $X_{N+1}$ in the current simplex with $X_c$, and returns to step 760. The method returns to ordering step 704, as shown in FIG. 7A.

Alternatively, if $f_c > f_r$, as determined by evaluation step 764, execution branches to shrink step 768, which computes N new points $V_2, V_3, \ldots, V_{N+1}$ for the current simplex. The $V_2, V_3, \ldots, V_{N+1}$ are determined by the following equation:

$$V_i = X_1 + \sigma(X_i - X_1), \ i = 2, \ldots, N+1 \tag{10}$$

where $\sigma$ a constant and N is the number of dimensions. In an exemplary embodiment, $\sigma = \frac{1}{2}$. Shrink step 768 replaces $X_2, X_3, \ldots, X_{N+1}$ of the current simplex with $V_2, V_3, \ldots, V_{N+1}$, resulting in an unordered set of vertices $X_1, V_2, V_3, \ldots, V_{N+1}$. Execution returns to step 760 and then back to ordering step 704, shown in FIG. 7A.

Returning now to step 752 of FIG. 7B, if the relationship $f_r \geq f_{N+1}$ is true, step 752 branches to inside contraction step 754, which computes $X_{cc}$ as a candidate for inclusion in a new simplex. $X_{cc}$ is determined by the following equations:

$$X_{cc} = \overline{X} - \gamma(\overline{X} - X_{N+1}) \tag{11a}$$

$$\overline{X} = \frac{\sum_{i=1}^{N} X_i}{N} \tag{11b}$$

where is $\gamma$ a constant and N is the number of dimensions. In an exemplary embodiment, $\gamma = \frac{1}{2}$.

Step 756 evaluates the penalty function at point $X_{cc}$ to yield $f_{cc}$. If the relationship $f_{cc} \leq f_{N+1}$ holds, execution branches to replacement step 758, which replaces $X_{N+1}$ in the current simplex with $X_{cc}$ and returns to step 760, and subsequently to ordering step 704.

If relationship $f_{cc} \geq f_{N+1}$ is true, step 756 branches to shrink step 768. As previously described, step 768 compute N new vertices and returns to ordering step 704, shown in FIG. 7A.

The constant parameters $\rho$, $\chi$, $\gamma$, and $\sigma$ are sometimes referred to as Nelder-Mead parameters.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention. As an example, a tracking algorithm described herein includes a simplex having three points (three azimuth and elevation pairs) in two-dimensional space. As another example, a tracking algorithm may provide control of an actuated sensor that has another degree of freedom that may be changed in real time to improve performance. This other degree of freedom (in addition to azimuth and elevation) may be, for example, range to the target of interest, output power, and/or transmitted wavelength. Thus, in addition to azimuth and elevation, a third parameter of control, resulting in an optimization simplex of four points in three dimensional space may be implemented having axes of azimuth, elevation, and this third controllable parameter.

As another example, a tracking penalty function described herein includes the ratio of the received energy at the on-line wavelength and the received energy at the off-line wavelength. As another example, a tracking penalty function may be constructed that simultaneously minimizes several measured parameters. For example, a sensor may be pointed in space and constrained in motion to some region of azimuth and elevation about a nominal orientation. In that case, terms may be added to the tracking penalty function that are negligible in value within the allowed motion of the actuator but become large in value when the azimuth or elevation angles exceed the imposed limits. This inhibits actuator motion outside the azimuth and elevation boundaries and simultaneously allows optimal tracking in the allowed region of space.

What is claimed is:

1. A method of tracking a target comprising the steps of:
   (a) receiving energy from the target at a plurality of spatial orientations;
   (b) processing the received energy;
   (c) forming a penalty function;
   (d) evaluating the penalty function at each of the plurality of spatial orientations;
   (e) selecting a further spatial orientation based only on the evaluating of step (d); and
   (f) orienting a receiver to receive energy from the target at the further spatial orientation, without use of a closed loop control servo mechanism.

2. The method of claim 1 wherein step (c) includes forming f(x), where x has N parameters, N being an integer, and
   step (d) includes evaluating f(x) at N+1 spatial orientations.

3. The method of claim 2 wherein N has a value of 2 and x is a pair of azimuth and elevation (az, el) values, and
   step (d) includes evaluating f(x) at three pairs of (az, el) values that form a triangle in two-dimensional space.

4. The method of claim 1 wherein step (d) includes measuring received energy at an on-line wavelength and an off-line wavelength, the on-line wavelength corresponding to an absorption resonance of a gas and the off-line wavelength corresponding to no-absorption of energy by the gas, and
   calculating the penalty function as a ratio of the received energy at the on-line wavelength and the received energy at the off-line wavelength.

5. The method of claim 1 wherein step (a) includes transmitting energy to the target and receiving reflected energy from the target.

6. The method of claim 1 wherein step (d) includes
(i) selecting a spatial orientation from among the plurality of spatial orientations determined to provide a maximum value for the penalty function,
(ii) reflecting the selected spatial orientation to form a reflected point,
(iii) evaluating the penalty function at the reflected point,
(iv) comparing a value of the penalty function at the reflected point with a value of each penalty function evaluated in step (d), and
step (e) includes selecting the further spatial orientation based on the comparing of substep (iv).

7. The method of claim 1 wherein the plurality of spatial orientations form a triangle in two-dimensional space, and
step (e) includes selecting the further spatial orientation as being located one of inside the triangle and outside the triangle,
wherein when the further spatial orientation is located inside the triangle, one of a shrink triangle and an inside contracted triangle is formed, and
when the further spatial orientation is located outside the triangle, one of an outside contracted triangle, a reflected triangle, and an expanded triangle is formed.

8. The method of claim 1 wherein
step (e) includes selecting the further spatial orientation, if a value of the penalty function at the further spatial orientation is smaller than a value of the penalty function of at least one spatial orientation of the plurality of spatial orientations.

9. The method of claim 1 wherein
step (d) includes evaluating the penalty function using Nelder-Mead optimization parameters.

10. The method of claim 1 wherein
step (f) includes commanding a gimbaled platform of the receiver based on evaluation of the penalty function and free-of any control loop connected to the gimbaled platform.

11. The method of claim 1 including the step of:
(h) repeating steps (a) through (f).

12. A method of orienting a receiver to track a target comprising the steps of:
(a) choosing a first set of points corresponding to a plurality of spatial orientations;
(b) separately orienting a receiver to receive energy from each of the first set of points;
(c) evaluating a penalty function of received energy at each point of the first set of points;
(d) choosing a second set of points based on the evaluation of step (c);
(e) separately orienting a receiver to receive energy from at least one point of the second set of points;
(f) evaluating the penalty function at the at least one point of the second set of points;
(g) selecting a point of the second set of points resulting in a minimum value of the penalty function;
(h) replacing a point of the first set of points with the point selected in step (g) to obtain a modified first set of points; and
(i) orienting the receiver based on the modified first set of points.

13. The method of claim 12, wherein step (e) includes orienting the receiver toward the at least one point, after calculating the at least one point using one of a shrink, an inside contraction, an outside contraction, a reflection, and an expansion.

14. The method of claim 12, wherein steps (b) through (i) are repeated until a predetermined condition is met.

15. The method of claim 12, wherein step (b) includes separately transmitting energy to each of the first set of points and step (e) includes transmitting energy to the at least one point.

16. A method of tracking a target comprising the steps of:
(a) receiving energy from the target at a plurality of spatial orientations;
(b) forming a penalty function based on the received energy;
(c) evaluating the penalty function at the plurality of spatial orientations;
(d) selecting a minimum value of the penalty function evaluated in step (c); and
(e) orienting a receiver to track the target based only on the selected minimum value in step (d), without use of a closed loop control servo mechanism.

17. The method of claim 16 wherein step (d) includes measuring received energy at an on-line wavelength and an off-line wavelength, the on-line wavelength corresponding to an absorption resonance of a gas and the off-line wavelength corresponding to no-absorption of energy by the gas, and
calculating the penalty function as a ratio of the received energy at the on-line wavelength and the received energy at the off-line wavelength.

18. An optimization-based sensor steering and tracking system comprising
a receiver/transmitter for receiving reflected energy from a target at a plurality of spatial orientations,
a gimbaled platform for orienting the receiver/transmitter to receive the reflected energy from the plurality of spatial orientations,
a processor for evaluating a penalty function at each of the plurality of spatial orientations, and
the processor coupled to the gimbaled platform for controlling an orientation of the receiver/transmitter, based only on evaluation of the penalty function at each of the plurality of spatial orientations, without use of a closed loop control servo mechanism.

19. The system of claim 18 wherein
the penalty function evaluated by the processor is a function of received energy from the target at three different pairs of (az, el) values that form a triangle in two-dimensional space.

20. The system of claim 18 wherein
the processor includes a calculator for finding a smaller value for the penalty function than at least one other value of the penalty function evaluated at the plurality of spatial orientations, and
the command to the gimbaled platform is based on a spatial orientation providing the smaller value for the penalty function.

* * * * *